United States Patent [19]

Viscusi

[11] Patent Number: 4,859,086
[45] Date of Patent: Aug. 22, 1989

[54] APPARATUS WITH NOVEL HOUSING HAVING UNIVERSAL BEARING SUPPORT STRUCTURE

[75] Inventor: David A. Viscusi, Carlisle, Pa.

[73] Assignee: General Signal Corporation, Stamford, Conn.

[21] Appl. No.: 173,971

[22] Filed: Mar. 28, 1988

[51] Int. Cl.⁴ .............................................. F16C 21/00
[52] U.S. Cl. .................................... 384/126; 384/208; 310/90
[58] Field of Search ........................ 310/90, 91, 89, 43; 384/206, 208, 428, 445, 536, 585, 909, 126

[56] References Cited

U.S. PATENT DOCUMENTS

| 3,156,838 | 11/1964 | Winther | 310/89 UX |
| 3,302,048 | 1/1967 | Gray | 310/90 |
| 3,313,964 | 4/1967 | Mattson | 310/90 |
| 3,391,290 | 7/1968 | Hahndorf | 310/90 |
| 3,418,504 | 12/1968 | Paule | 310/90 |
| 4,227,826 | 10/1980 | Conrad | 384/206 |

FOREIGN PATENT DOCUMENTS

| 1013469 | 8/1957 | Fed. Rep. of Germany | 310/90 |
| 2351204 | 4/1975 | Fed. Rep. of Germany | 310/90 |
| 3038135 | 4/1981 | Fed. Rep. of Germany | 310/90 |
| 0244923 | 6/1947 | Switzerland | 310/90 |

*Primary Examiner*—R. Skudy
*Attorney, Agent, or Firm*—Robert R. Hubbard; Robert S. Smith

[57] ABSTRACT

A mounting for a bearing which comprises a cavity which has at least a portion thereof formed in a spherical section and another portion of the cavity is in the form of a groove extending outwardly from the spherical section. Thus, either a bearing having an external envelope that is a sphere or a cylindrical section may be installed in the cavity.

6 Claims, 1 Drawing Sheet

APPARATUS WITH NOVEL HOUSING HAVING UNIVERSAL BEARING SUPPORT STRUCTURE

BACKGROUND OF THE INVENTION

The invention relates to electric motors and particularly to arrangements for supporting the bearings of such motors. While the application has particular application to small and inexpensive electric motors used in various applications such as electric vacuum cleaners, it will be understood that the invention also has application to a wide variety of other electric motors as well as other devices in which it is desired to mount a variety of bearing types interchangeably in the same housing.

The prior art includes various constructions for such motors which have a so called clam-shell housing. Such housings have two mating halves. In such constructions the mating halves will collectively define a cavity or groove within the opening dimensioned and configured for accommodating a bearing such as a ball bearing. The prior art motors have also utilized spherical bearings. These spherical bearings are often used in such motors and they are characterized by an outer envelope which is substantially spherical as opposed to the substantially cylindrical section which characterizes many ball bearings as well as many journal bearings. A prior art construction that provides a common housing to interchangeably mount a spherical bearing or a bearing in the form of a cylindrical section utilized a cupped spring washer disposed in coaxial relationship with a spherical bearing to provide a force on the spherical bearing. The cupped spring washer was installed in a groove in the housing which was dimensioned and configured to alternatively accomodate either the spherical or cylindrical section outer bearing envelope. The cupped spring washer in these motors pushed the spherical bearing into a recess in the housing.

It is an object of the invention to provide a motor and a motor with a housing having a single construction which will interchangeably accept spherical bearings as well as bearings which have an outer envelope which is substantially a cylindrical section such as ball bearings and which do not require the use of springs for mountings the spherical bearings.

It is another object of the invention to provide standardization of parts used in various motor constructions so as to achieve maximum economies of scale in manufacturing of such parts.

It is still another object of the invention to provide a construction which insures precise location of the bearings for maximum motor life.

SUMMARY OF THE INVENTION

It has now been found that these and other objects of the invention may be attained in a mounting for a bearing which comprises a cavity which has at least a portion thereof formed in a spherical section and another portion of the cavity is in the form of a groove extending outwardly from the spherical section.

The spherical section and the groove may have a common axis. The cavity may be formed of a plastic resin material and more particularly be formed of a thermoplastic resin material.

The invention also comprehends a motor having a shaft carried by at least one bearing carried in at least one mounting for the bearing. The mounting for the bearing includes the spherical section cavity and outwardly extending groove.

BRIEF DESCRIPTION OF THE DRAWING

The invention will be better understood by reference to the accompanying drawing in which.

DESCRIPTION OF THE PREFERRED EMBODIMENT

Figure 1:
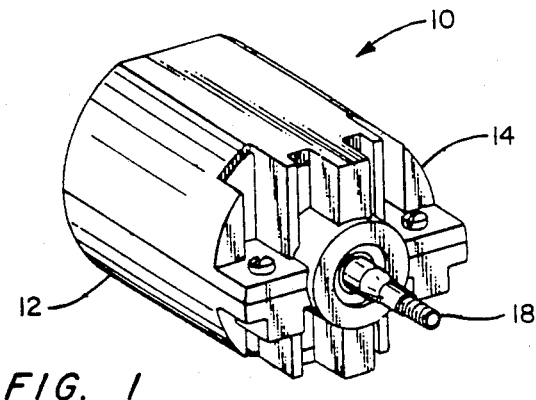
FIG. 1 is a perspective view of a motor incorporating one form of the present invention.

Referring now to FIG. 1 there is shown a motor 10 in accordance with the present invention. The motor 10 is characterized by a housing which comprises an assembly half 12 and a cover half 14. It will be understood that typically such motors are assembled in the assembly half 12 and thereafter the cover half 14 is mated with the assembly half 12 to fully enclose the motor.

Figure 2:
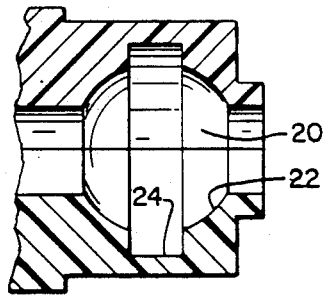
FIG. 2 is an elevational cross sectional view of a portion of the housing shown in FIG. 1 and illustrates the cavity provided in the housing for receiving either a bearing shaped like a conventional ball bearing or a spherical bearing.

The typical motor 10 will have a bearing disposed near each axial extremity of the shaft 18 in the conventional manner. The bearing that is installed in such motors may vary in shape and construction for various applications. The present invention eliminates the need for cupped spring washers to mount spherical bearings and permits installation of various bearings having very different outer envelopes in the same cavity within the same housing. The cavity 20 is best illustrated in FIG. 2 where it is apparent that the cavity 20 includes a portion that is a spherical section 22 that is dimensioned and configured for tight fitting engagement with the exterior surface of a spherical bearing (not shown). The cavity 20 also includes a groove 24 dimensioned and configured for receiving a bearing which is substantially a cylindrical section such as the typical ball bearing. It will be understood that the cavity 20 is defined by the respective assembly half 12 and cover half 14. The spherical section 22 and the groove 24 have a common axis.

Figure 3:
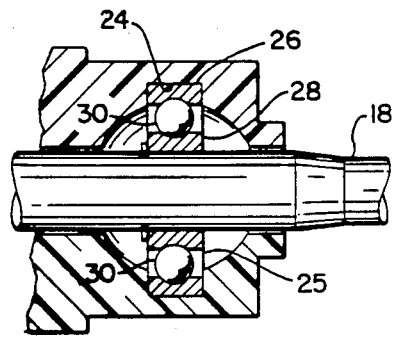
FIG. 3 is an elevational view in partial section of one bearing mounting for the motor illustrated in FIG. 1 and which shows an installation of a ball bearing in accordance with one form of the present invention.

As best seen in FIG. 3, a ball bearing 25 fits in the cavity 20 with the outer envelope of the bearing 26 tightly engaged with the groove 24. The bearing 25 includes an inner race 28 engages the shaft 18 and an outer race 26 that is separated from the inner race 28 by balls 30,30.

Figure 4:
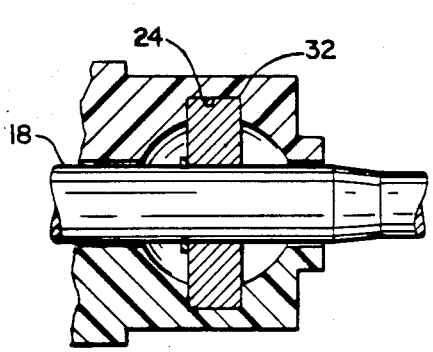
FIG. 4 is an elevational view in partial section of one bearing portion of a motor in which a journal bearing substantially in form of a cylinder is mounted within the groove within the housing.

The same cavity 20 also will receive a cylindrical journal bearing 32 as best illustrated in FIG. 4 in which the outer peripheral surface of the cylindrical journal bearing tightly engages the groove 24 and the central bore thereof is dimensioned for the free revolution of the shaft 18.

Figure 5:
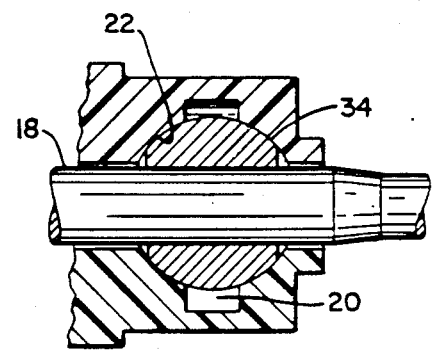
FIG. 5 is an elevation view and partial section of the bearing portion of a motor such as the motor in FIG. 1 in which a spherical bearing is installed in the same cavity illustrated in FIG. 2.

As best seen in FIG. 5, a spherical bearing 34 is shown installed in the cavity 20. The spherical bearing 34 shown therein has an outer surface which is a spherical section and which is tightly engaged by the spherical section 22 of the cavity 20. The shaft 18 rotates freely within a central bore of the spherical bearing. As illustrated, the spherical bearing 34 is a journal bearing. It will be understood that other spherical bearings may also be utilized in the cavity 20.

The invention has been shown and described with respect to a housing which is manufactured of a plastic resin material. It will be understood that in various other forms of the invention, the housing may be metallic.

The invention has been described with reference to its illustrated preferred embodiment. Persons skilled in the art of motors and rotating assemblies may upon exposure to the teachings herein, conceive other variations. Such variations are deemed to be encompassed by the disclosure, the invention being delimited only by the appended claims.

Having thus described my invention I claim:

1. A mounting for a bearing which comprises ;
a body having a cavity which includes a first portion which is a spherical section and a second portion thereof which is adjacent to said first portion and which is a cylindrical section, said spherical section being dimensioned and configured for holding a spherical bearing and said cylindrical section being dimensioned and configured for holding a generally cylindrical shaped bearing, whereby from a group consisting of a spherical bearing and a cylindrical bearing can be installed in said body.

2. The mounting as described in claim 1 wherein:
the spherical section and the cylindrical section have a common axis.

3. The mounting as described in claim 2 wherein:
said body is a plastic resin material.

4. A mounting for a bearing which comprises:
a body having a cavity having a cylindrical section shaped groove and a spherical section shaped cavity, said cavity bounding both sides of said groove, said spherical section shaped cavity being dimensioned and configured for holding a spherically shaped bearing and said cylindrical section shaped groove being dimensioned and configured for holding a generally cylindrically shaped bearing, whereby from a group consisting of a spherical bearing and a cylindrical bearing can be installed in said body.

5. The mounting as described in claim 4 wherein:
the spherical section shaped cavity and said groove have a common axis.

6. The mounting as described in claim 5 wherein:
said body is a plastic resin material.

* * * * *